United States Patent
Nergis

(10) Patent No.: US 7,675,986 B1
(45) Date of Patent: *Mar. 9, 2010

(54) METHOD FOR REDUCING PEAK-TO-AVERAGE POWER RATIOS IN A MULTI-CARRIER TRANSMISSION SYSTEM

(75) Inventor: Aydin Nergis, San Diego, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 487 days.

This patent is subject to a terminal disclaimer.

(21) Appl. No.: 11/602,482

(22) Filed: Nov. 20, 2006

Related U.S. Application Data

(63) Continuation of application No. 10/195,287, filed on Jul. 15, 2002, now Pat. No. 7,139,322.

(51) Int. Cl.
*H04K 1/10* (2006.01)
*H04L 27/28* (2006.01)

(52) U.S. Cl. .................. 375/260; 375/265; 375/262; 375/296; 375/340; 375/341; 370/210; 455/59

(58) Field of Classification Search .............. 375/260, 375/259, 262, 296, 340, 341, 265; 370/210; 455/59
See application file for complete search history.

(56) References Cited

U.S. PATENT DOCUMENTS

| | | | |
|---|---|---|---|
| 6,597,746 B1 | 7/2003 | Amrany et al. | |
| 6,731,695 B2 | 5/2004 | Tzannes et al. | |
| 6,757,299 B1 | 6/2004 | Verma | |
| 6,891,896 B1 | 5/2005 | Betts | |
| 6,928,084 B2 | 8/2005 | Cimini, Jr. et al. | |
| 7,139,322 B1 * | 11/2006 | Nergis | 375/260 |
| 2001/0022777 A1 * | 9/2001 | Bourget et al. | 370/210 |

OTHER PUBLICATIONS

A novel peak power reduction scheme for OFDM, Muller, S.H.; Personal, Indoor and Mobile Radio Communications, 1997. 'Waves of the Year'. PIMRC '97., The 8th IEEE International Symposium on vol. 3, Sep. 1-4, 1997 pp. 1090-1094 v. 3.
Werner Henkel, et al., "Another Application for Trellis Shaping: PAR Reduction for DMT (OFDM)", IEEE Transactions on Communications, vol. 48, No. 9, Sep. 2000, p. 1471-1476.
Xiaodong Li, et al., "Effects of Clipping and Filtering on the Performance of OFDM", IEEE Communications Letters, vol. 2, No. 5, May 1998, p. 131-133.

\* cited by examiner

*Primary Examiner*—Phuong Phu

(57) ABSTRACT

The present invention provides a technique to reduce peak-to-average power ratio (PAR) of multi-carrier transmission systems. A non-empty subset of the subcarriers includes "PAR subcarriers." The PAR subcarriers have constellations obtained by reducing a constellation that is higher than binary and invariant under multiplication by −1, so that an element is in the reduced constellation if and only if its negative is not. In this way, only one bit per PAR subcarrier is used for PAR reduction. The technique addressed in this invention multiplies a subset of the PAR subcarriers by −1 to reduce PAR at each multi-carrier symbol transmission. A method or apparatus is operated to select the subset of PAR subcarriers to be rotated. The receiver identifies the PAR subcarriers and estimates the subcarriers multiplied by −1 according to the reduced constellations and the received samples.

21 Claims, 8 Drawing Sheets

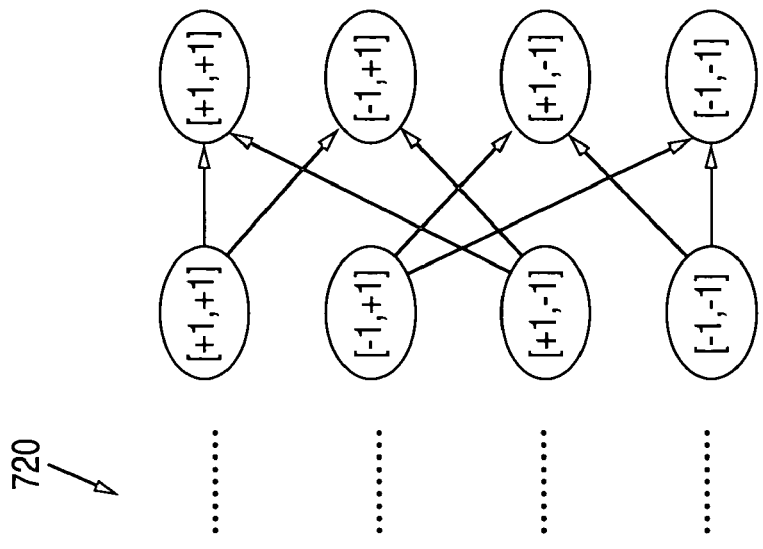
FIG. 7B
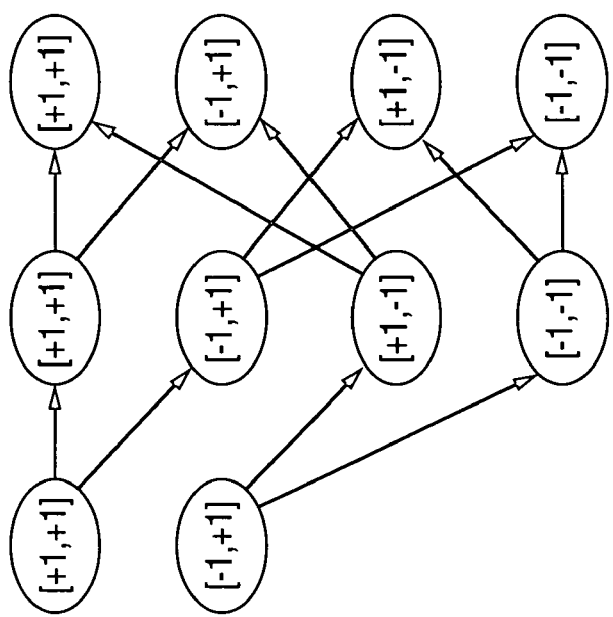
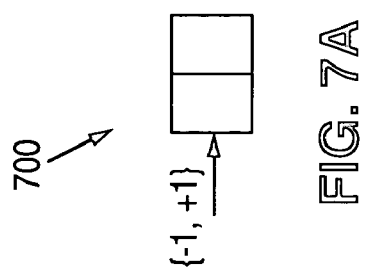
FIG. 7A

METHOD FOR REDUCING PEAK-TO-AVERAGE POWER RATIOS IN A MULTI-CARRIER TRANSMISSION SYSTEM

This application is a continuation of prior U.S. patent application Ser. No. 10/195,287 filed on Jul. 15, 2002 now U.S. Pat. No. 7,139,322.

TECHNICAL FIELD OF THE INVENTION

The present invention relates generally to communication systems and, more particularly, to a method for reducing peak-to-average power ratios in a multi-carrier transmission system.

BACKGROUND OF THE INVENTION

High-speed data communication may be provided through the use of multi-carrier transmission systems. However, multi-carrier transmission systems generally have a high peak-to-average power ratio (PAR), which is undesirable. PAR increases in proportion to the number of subcarriers and the order of constellations. However, peak power is limited by frequency regulation agencies, such as the Federal Communication Commission in the United States. Moreover, a high PAR corresponds to a relatively wide dynamic range in transceivers. Due to realization limitations, multi-carrier signals are typically amplified with a large back off in radio frequency power amplifiers. This reduces both the power efficiency and the average power emission, resulting in a decrease in the transmission range.

The peak power of a multi-carrier transmission system is defined to be the power of a sine wave with an amplitude equal to the maximum envelope. Hence, PAR is defined to be the ratio of the peak power to the average power (see R. van Nee and R. Prasad, OFDM Wireless Multimedia Communications, Artech House, 2.000).

However, because the peak power has large variations according to the statistical characteristics of transmitted information symbols, a statistical metric is generally used to determine PAR (see X. Li and L. J. Cimini, "Effects of clipping and filtering on the performance of OFDM," IEEE Communications Letters, vol. 2, no. 5, pp. 131-133, May 1998). Thus, PAR can be determined based on a cumulative probability. For example, PAR for probability, p, is the ratio of the instantaneous peak power, $\mu^2$, to the average power, where the probability of the instantaneous power less than $\mu^2$ is p.

According to absolute values, the PAR with probability one can be much higher. However, due to statistical distributions, the peaks, which have small occurrence probabilities, can be ignored. Thus, the clipping of the peaks with a cumulative probability less than one becomes effective on the performance. As used herein, therefore, "effective probability" means the smallest cumulative probability so that the clipping of the amplitude levels with a cumulative probability more than this cumulative probability does not affect the transmission performance considerably.

The PAR with effective probability can be more than 10 dB. Several previous attempts have been made to reduce PAR by as much as 3 dB. A summary of these attempts can be found in the book R. van Nee and R. Prasad, OFDM Wireless Multimedia Communications, Artech House, 2000. The preliminary attempts focused on clipping of the multi-carrier signal. However, clipping causes in-band and out-of-band distortion which degrades the transmission performance.

Scrambling methods, such as selected mapping and partial transmit sequences, do not guarantee a PAR ratio below some low level. On the other hand, Reed-Muller codes use redundancy to reduce PAR to 3 dB along with error correction. However, Reed-Muller codes result in a considerable data rate reduction as the number of subcarriers increases. According to K. G. Paterson and V. Tarokh, "On the existence good codes with low peak-to-average power ratios," IEEE Trans. on Information Theory, vol. 46, no. 6, September 2000, the coding distance and PAR are in contrary relation for constant amplitude modulation (such as Quadrature Phase Shift Keying and 8-Phase Shift Keying). That is, low PAR implies small coding distance, which is undesirable, and large coding distance implies high PAR, which is also undesirable.

Another method provides for considering the PAR reduction as a trellis shaping problem (see W. Henkel and B. Wagner, "Another application for trellis shaping: PAR reduction for DMT (OFDM)," IEEE Trans. on Communications, vol. 48, no. 9, September 2000). Trellis shaping adds redundancy in the transmitter so the output sequence is the output of a convolutional decoding. The redundancy is added in the transmitter through a trellis diagram so that the PAR of the output sequence becomes low. A feedback from time domain to frequency domain is employed. At the receiver, the received sequence is encoded by the corresponding convolutional encoder and then the original data sequence is recovered. However, this method selects redundant bits to reduce PAR within the structure of the used convolutional coding and hence may limit the achievable PAR reduction per the number of redundant bits. Moreover, it needs an implementation of a convolutional encoder in the receiver. Finally, a part of its complexity in the transmitter comes from the redundancy calculation according to a convolutional decoding structure.

SUMMARY OF THE INVENTION

In accordance with the present invention, a method for multi-carrier transmission are provided that substantially reduce peak-to-average power ratio (PAR) with low redundancy. In particular, a portion of the subcarriers in a multi-carrier signal are multiplied by −1 before transmission and again after being received, allowing the PAR for the multi-carrier transmission system to be considerably reduced.

According to one embodiment of the present invention, a method for reducing peak-to-average power ratios in a multi-carrier transmission system is provided. The method includes receiving a plurality of modulator outputs. The modulator outputs comprise PAR subcarriers and non-PAR subcarriers. A subset of the PAR subcarriers is selected to be rotated by 180°. The selected subset of PAR subcarriers is rotated by 180°. A transformer output is generated based on the modulator outputs using the rotated PAR subcarriers, the unrotated PAR subcarriers and the unrotated non-PAR subcarriers.

Technical advantages of one or more embodiments of the present invention include providing an improved method for reducing peak-to-average power ratios (PARs) in a multi-carrier transmission system. In a particular embodiment, redundancy to reduce PAR is introduced by reducing the constellations corresponding to a subset of subcarriers. Those subcarriers are called "PAR subcarriers." The constellations corresponding to the PAR subcarriers must be higher than binary and invariant under multiplication by −1. Examples of these constellations include, but are not limited to, Quadrature Phase Shift Keying (QPSK) and Quadrature Amplitude Modulation (16-QAM or 64-QAM).

The constellations corresponding to PAR subcarriers are reduced by half so that a constellation point is in the reduced constellation if and only if its 180° rotated equivalent is not. Therefore, only one bit per PAR subcarrier is used for PAR reduction.

For each multi-carrier transmission symbol, a method or apparatus is operated to select which PAR subcarriers are to be multiplied by −1 to reduce PAR. Based on the results, the selected subset of the PAR subcarriers are rotated 180° degrees before transmission. The receiver identifies the set of PAR subcarriers and estimates the rotated subset of PAR subcarriers according to the received samples and the reduced constellations.

The method and system provided by this invention can be applied to multi-carrier systems, including orthogonal frequency division multiplexing (OFDM) systems, in many different realizations. The method or apparatus that selects the subset of the PAR subcarriers to be rotated 180° degrees to reduce PAR determines the level of complexity and achieved PAR reduction for a given number of PAR subcarriers. In one embodiment, a trellis search algorithm can be employed with a pre-specified depth. The branch selection decisions in the frequency domain are done by the metrics calculated in the time domain. The simulation results for an OFDM system with 48 subcarriers and 64-QAM constellations for each subcarrier show that a 5 dB PAR with a probability of 99.9% can be achieved by means of a trellis algorithm with depth 2 (four states) and 24 PAR subcarriers, as compared to an original PAR of 8.4 dB with a probability of 99.9%. Hence, for this embodiment, a 3.4 dB decrease in PAR is provided with ¹⁄₁₂ redundancy.

Other technical advantages of the method in the present invention include high PAR reduction in relation to redundancy. If a multi-carrier system has K subcarriers, each subcarrier has a $2^b$-QAM constellation, and $K_1$ subcarriers are assigned to be PAR subcarriers, then the redundancy becomes $$\frac{K_1}{K \cdot b}.$$

Thus, the limit on redundancy is determined by the order of the constellations.

In addition, the method in the present invention requires less complexity than trellis shaping for PAR reduction (see W. Henkel and B. Wagner, "Another application for trellis shaping: PAR reduction for DMT (OFDM)," IEEE Trans. on Communications, vol. 48, no. 9, September 2000).

Other technical advantages will be readily apparent to one skilled in the art from the following figures, description, and claims.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIGS. 7A-B are block diagrams illustrating a shift register and a trellis diagram that may be used in the transmission system of FIG. 1 in order to implement a peak-to-average power ratio reduction technique in accordance with one embodiment of the present invention;

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged multi-carrier transmission system.

The embodiments and explanation provided below describe a peak-to-average power ratio (PAR) reduction technique that may be implemented in a multi-carrier transmission system. The description includes a basic realization of multi-carrier transmission systems for precise and clear explanation. Therefore, some techniques, which can be employed together with the PAR reduction technique described in this method, are omitted from the description. For example, the following techniques are not discussed: pilot subcarriers for accurate frequency/phase synchronization, cyclic extension for alleviating inter-symbol interference in Orthogonal Frequency Division Multiplexing (OFDM), equalization in time and frequency domain, antenna diversity, any linear and non-linear operation for transmission spectrum considerations, and the like.

Figure 1:
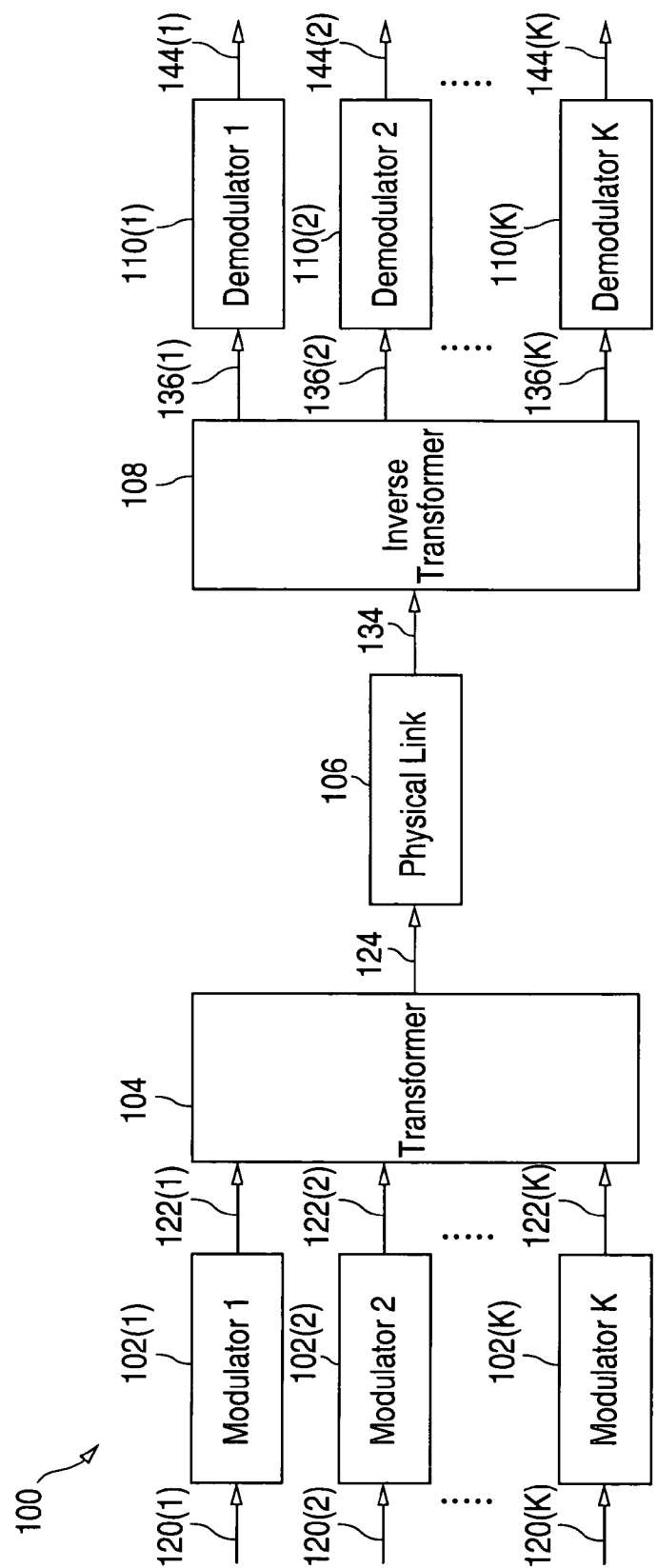
FIG. 1 is a block diagram illustrating a multi-carrier transmission system operable to reduce peak-to-average power ratios in accordance with one embodiment of the present invention.
Figure 2:
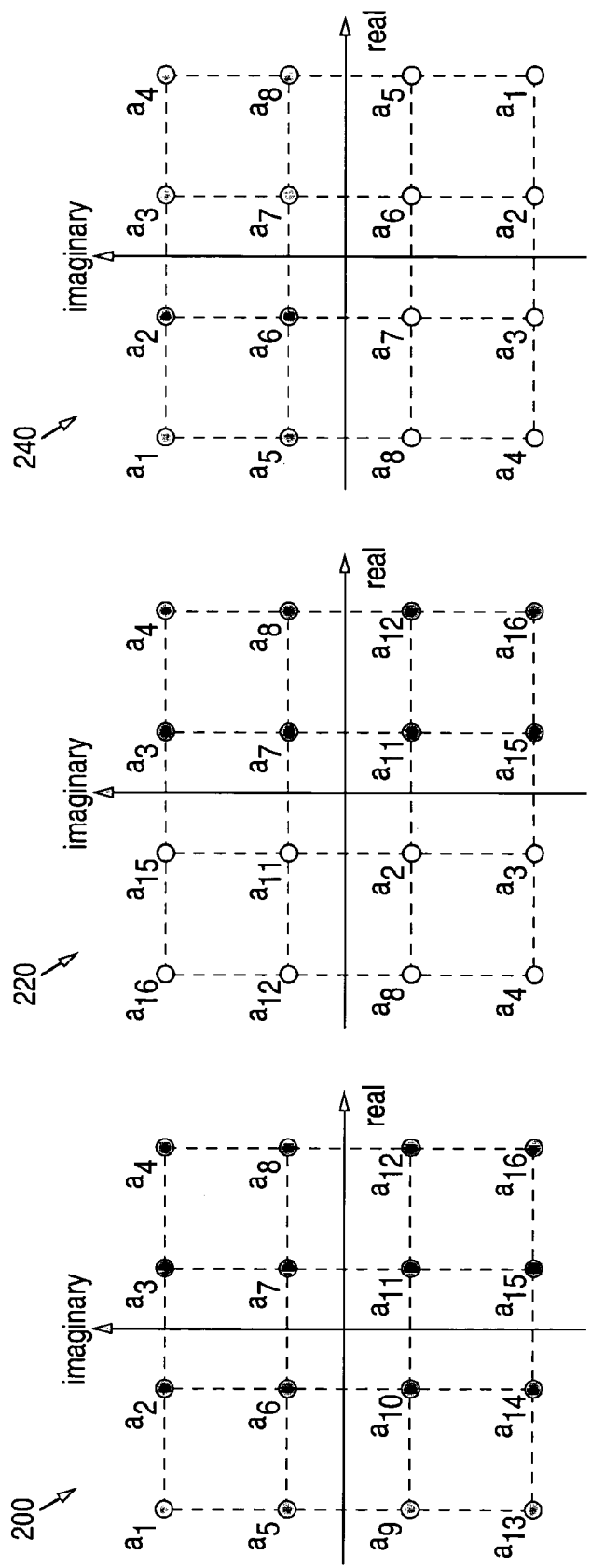
FIGS. 2A-C are block diagrams illustrating an example of one type of constellation that may be used in the transmission system of FIG. 1 in accordance with one embodiment of the present invention.

FIG. 1 is a block diagram illustrating a multi-carrier transmission system 100 operable to reduce PAR in accordance with one embodiment of the present invention. The transmission system 100 is operable to transmit and receive a multi-carrier signal that comprises a plurality of subcarriers. The subcarriers are classified into two subsets: PAR subcarriers and non-PAR subcarriers. The subset of PAR subcarriers is assumed to be non-empty.

As used herein, a "PAR subcarrier" means a subcarrier that is modulated according to a constellation that is higher than binary and invariant under 180° degrees rotation about the origin in the complex plane, while a "non-PAR subcarrier" means a subcarrier other than a PAR subcarrier. Thus, a PAR subcarrier is modulated according to a constellation in which the multiplication of a constellation point by −1 (or, in other words, rotation by 180°) is another point in the same constellation, such as Quadrature Phase Shift Keying, 8-Phase Shift Keying, 16-Quadrature Amplitude Modulation, 64-Quadrature Amplitude Modulation, any arbitrary rotated version of these or any other suitable constellation.

For the described embodiment, it is assumed that the transmission system 100 has K subcarriers, where K is a non-zero positive integer. The subcarriers are indexed by (1), (2), ... and (K). It is also assumed that the first $K_1$ subcarriers are PAR subcarriers, where $K_1$ is a non-zero positive integer less than or equal to K. In fact, any non-empty subset of the subcarriers with $K_1$ elements can be selected to be the PAR subcarriers. However, these systems are equivalent under the operation of re-indexing (re-labeling). Therefore, it may be assumed that the PAR subcarriers are the first $K_1$ subcarriers without reducing possible implementations of the invention.

The transmission system 100 comprises a plurality of modulators 102(1), 102(2), ... and 102(K), a transformer 104, a physical link 106, an inverse transformer 108 and a plurality of demodulators 110(1), 110(2), ... and 110(K). The modulators 102(1), 102(2), ... and 102(K), are each assigned to a different subcarrier. As used herein, "each" means every one of at least a subset of the identified items.

The modulators 102(1), 102(2), ... and 102(K) are operable to receive digital information symbols 120(1), 120(2), and 120(K) and to map the digital symbols 120(1), 120(2), and 120(K) into the complex plane according to their constellations to generate modulator outputs 122(1), 122(2), ... and 122(K), respectively. The constellation of a modulator 102 corresponding to a PAR subcarrier is reduced by half so that a constellation point is in the reduced constellation if and only if its 180° rotated equivalent is not. Therefore, the corresponding digital symbols 120 are reduced by one bit.

FIGS. 2A-C are diagrams illustrating an example of one type of constellation, along with two possible reductions, that may be used in the transmission system 100 in accordance with one embodiment of the present invention. This constellation may correspond to a PAR subcarrier in that the constellation is higher than binary and invariant under 180° rotation about the origin in the complex plane. The constellation illustrated in FIGS. 2A-C comprises a 16-Quadrature Amplitude Modulation (16-QAM) constellation; however, as described in more detail above in connection with FIG. 1, other suitable constellation types may be used in the transmission system 100 without departing from the scope of the present invention.

FIG. 2A illustrates a full 16-QAM constellation 200 in the complex plane. The constellation points are identified by the letters $a_1, a_2, \ldots, a_{16}$. The constellation 200 is symmetric around the real and imaginary axes. Thus, multiplication of a constellation point by −1 yields another point in the same constellation. For example, the multiplication of $a_8$ by −1 results in $a_9$.

FIG. 2B illustrates a reduced 16-QAM constellation 220 in accordance with one embodiment of the present invention. The points in the right complex plane are used for modulation. Therefore, instead of representing four bits at each point, three bits may be represented by each point in this constellation 220. This redundancy is introduced to reduce the PAR. FIG. 2C illustrates a reduced 16-QAM constellation 240 in accordance with another embodiment of the present invention. In this constellation 240, the points in the upper-half complex plane are used for modulation.

Returning to FIG. 1, the modulator outputs 122(1), 122(2), ... and 122(K) enter the transformer 104 in parallel. The transformer 104 is operable to receive the modulator outputs 122(1), 122(2), ... and 122(K) and to generate a transformer output 124. The transformer output 124 comprises the sum of the subcarriers with modulated phase and amplitude according to the corresponding modulator outputs 122(1), 122(2), ... and 122(K). In addition, the transformer 104 is operable to select a subset of PAR subcarriers that are to be rotated by 180° degrees in order to reduce PAR. The transformer 104 is also operable to rotate the selected PAR subcarriers by 180° before generating the output signal 124.

The transformer output 124 is transmitted over a physical link 106. The physical link 106 represents all of the possible characteristics between any pair of a transmitter and a receiver of a multi-carrier transmission system from the output of the transformer 124 to the input of the inverse transformer 134. Therefore, the physical link 106 may comprise a transmit filter, a digital-to-analog converter, an analog-to-digital converter, power amplifiers, a low-noise amplifier, a receive filter, a propagation medium, inaccurate acquisition and tracking, and the like.

The inverse transformer 108 is operable to receive the inverse transformer input 134 from the physical link 106 and to generate a plurality of demodulator inputs 136(1), 136(2), ... and 136(K) based on the multi-carrier transmission symbols at the inverse transformer input 134 for the demodulators 110(1), 110(2), ... and 110(K). The inverse transformer outputs 136(1), 136(2), ... and 136(K) enter the demodulator 110(1), 110(2), and 110(K) in parallel.

In accordance with their modulation constellations, each demodulator 110 is operable to generate a demodulator output 144(1), 144(2), ... and 144(K) based on the demodulator inputs 136(1), 136(2), ... and 136(K) by performing hard detection through converting the complex numbers in the demodulator inputs 136(1), 136(2), ... and 136(K) into digital symbols, by performing information-bearing metrics for soft detection, or in any other suitable manner.

Figure 3:
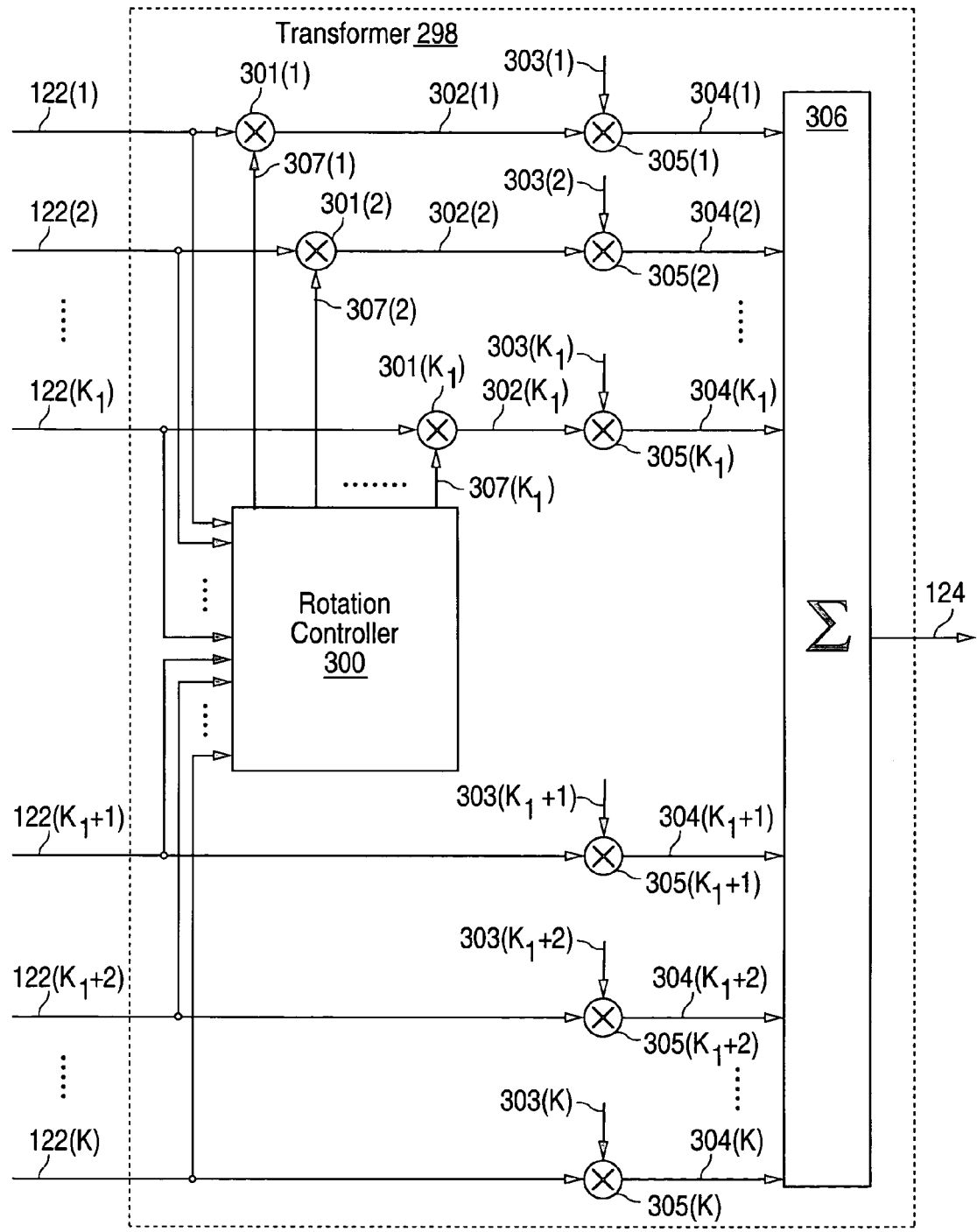
FIG. 3 is a block diagram illustrating the transformer of FIG. 1 in accordance with a first embodiment of the present invention.

FIG. 3 is a block diagram illustrating a transformer 298 in accordance with one embodiment of the present invention. The transformer 298 may be used as one embodiment of the transformer 104. As stated above, for precise and clear explanation, the first $K_1$ subcarriers are selected to be PAR subcarriers. Therefore, the modulators outputs 122(1), 122(2), ... and $122(K_1)$ are assigned to different PAR subcarriers, while the modulator outputs $122(K_1+1), 122(K_1+2), \ldots$ and 122(K) are assigned to different non-PAR subcarriers.

The transformer 298 compromises a rotation controller 300, a combiner 306, a plurality of first multipliers 301(1), 301(2), and $301(K_1)$, and a plurality of second multipliers 305(1), 305(2), ... and 305(K).

The rotation controller 300 is operable to select the PAR subcarriers that are to be rotated to reduce PAR according to the whole or a part of the modulator outputs 122(1), 122(2), . . . and 122(K), in addition to the subcarrier frequencies and their initial phases. The rotation controller 300 is also operable to output either +1 or −1 at its outputs 307(1), 307(2), . . . and 307(K$_1$) so that the modulator outputs 122(1), 122(2), . . . and 122(K) corresponding to the selected PAR subcarriers are rotated 180° and the modulator outputs 122(1), 122(2), . . . and 122(K) corresponding to the unselected PAR subcarriers are not rotated at the output of the first multipliers 301(1), 301(2), . . . and 301(K$_1$).

The rotated and unrotated modulator outputs 302(1), 302(2), and 302(K$_1$) and the modulator outputs corresponding to non-PAR subcarriers 122(K$_1$+1), 122(K$_1$+2), . . . and 122(K) modulate subcarriers 303(1), 303(2), . . . and 303(K) through the second multipliers 305(1), 305(2), . . . and 305(K), respectively, in parallel.

The combiner 306 is operable to sum the modulated subcarriers 304(1), 304(2), . . . and 304(K) in the time domain. This operation may be repeated for each multi-carrier transmission symbol with a predefined duration (multi-carrier symbol period).

Figure 4:
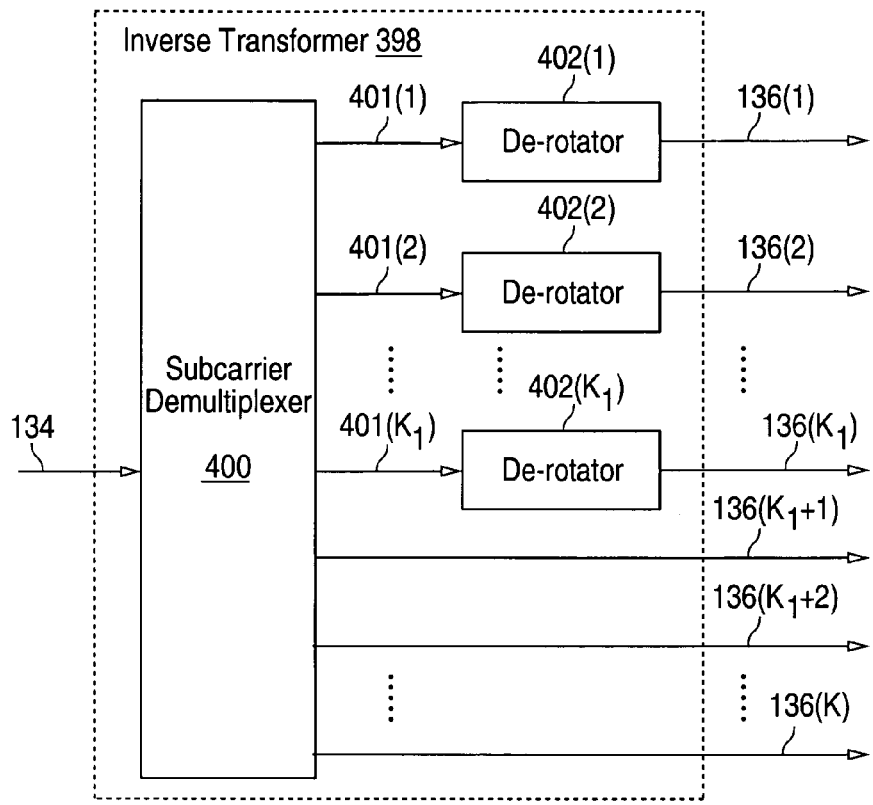
FIG. 4 is a block diagram illustrating the inverse transformer of FIG. 1 in accordance with a first embodiment of the present invention.

FIG. 4 is a block diagram illustrating an inverse transformer 398 in accordance with one embodiment of the present invention. The inverse transformer 398 may be used as one embodiment of the inverse transformer 108. According to one embodiment, the inverse transformer 398 is used as the inverse transformer 108 in the transmission system 100, while the transformer 298 is used as the transformer 104.

The inverse transformer 398 compromises a subcarrier demultiplexer 400 and a plurality of de-rotators 402(1), 402(2), . . . and 402(K). The subcarrier demultiplexer 400 is operable to estimate the complex symbols 302(1), 302(2), . . . and 302(K$_1$) and 122(K$_1$+1), 122(K$_1$+2), . . . and 122(K) modulating the subcarriers 303(1), 303(2), . . . and 303(K), respectively. The subcarrier demultiplexer 400 is also operable to generate a kind of metrics for each subcarrier for further soft-decision detection or hard-decision detection. Because these are not within the scope of the present invention, the term "estimate" is used in a broad sense. As such, the term "estimate" may refer to a "hard decision," a "soft decision," or other suitable means of estimation.

The outputs of the subcarrier demultiplexer 400 corresponding to PAR subcarriers 401(1), 401(2), . . . and 401(K$_1$) enter the de-rotators 402(1), 402(2), . . . and 402(K$_1$), respectively, in parallel. A de-rotator 402 assigned to a PAR subcarrier 401 is operable to determine whether the subcarrier 401 has been rotated or not according to the reduced constellation assigned to that subcarrier 401. For example, according to one embodiment, if the estimate is within the unused region of the corresponding reduced constellation, then the subcarrier 401 is determined to be rotated. Otherwise, it is determined to be un-rotated. De-rotation may be done by rotation of the subcarrier 401 by 180°.

Orthogonal Frequency Division Multiplexing (OFDM) is a multi-carrier transmission system (See R. van Nee and R. Prasad, OFDM Wireless Multimedia Communications, Artech House, 2000). One embodiment of the transformer 104 and the inverse transformer 108 for a possible OFDM system with the PAR reduction technique described above are illustrated in FIGS. 5 and 6, respectively.

Figure 5:
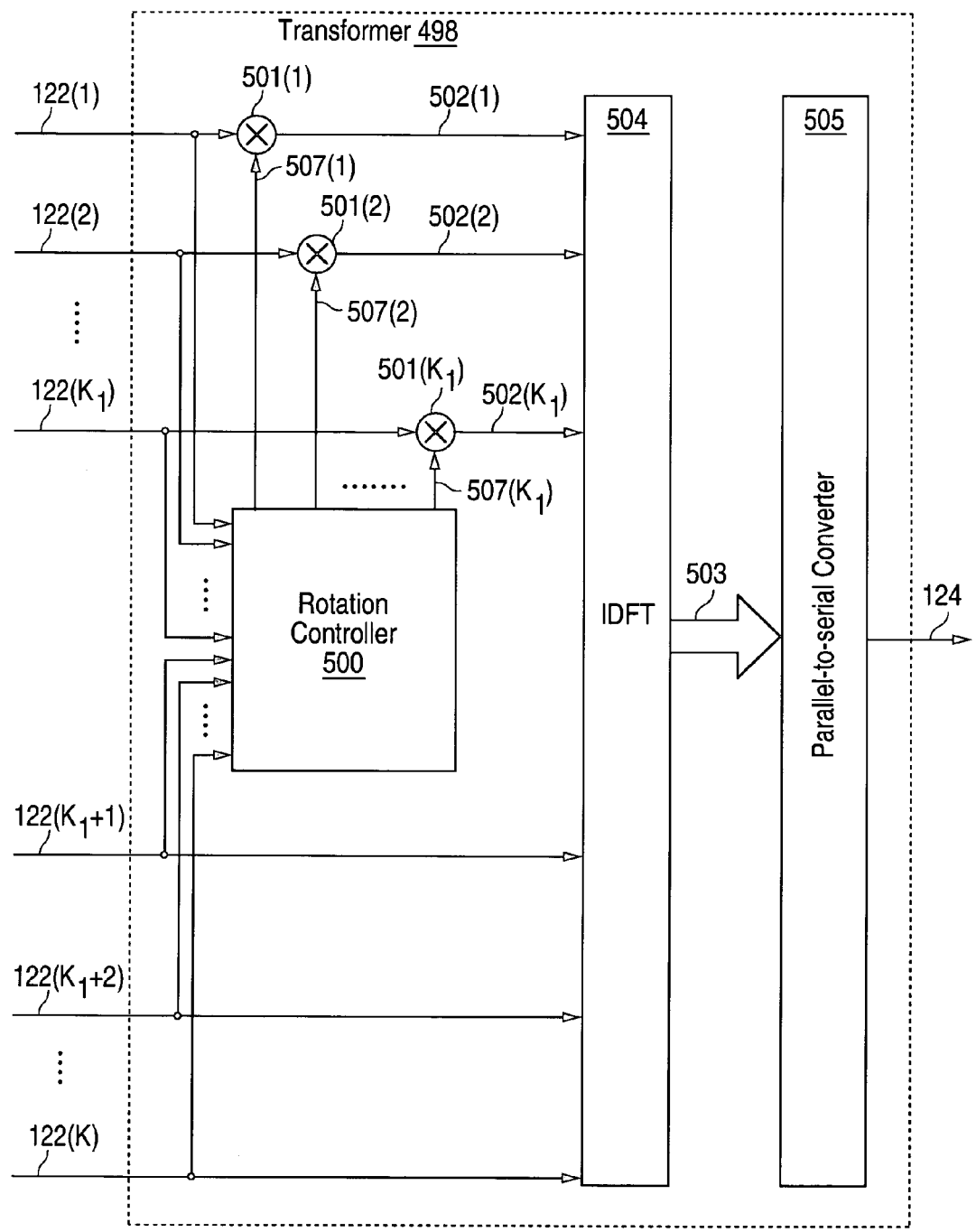
FIG. 5 is a block diagram illustrating the transformer of FIG. 1 in accordance with a second embodiment of the present invention.
Figure 6:
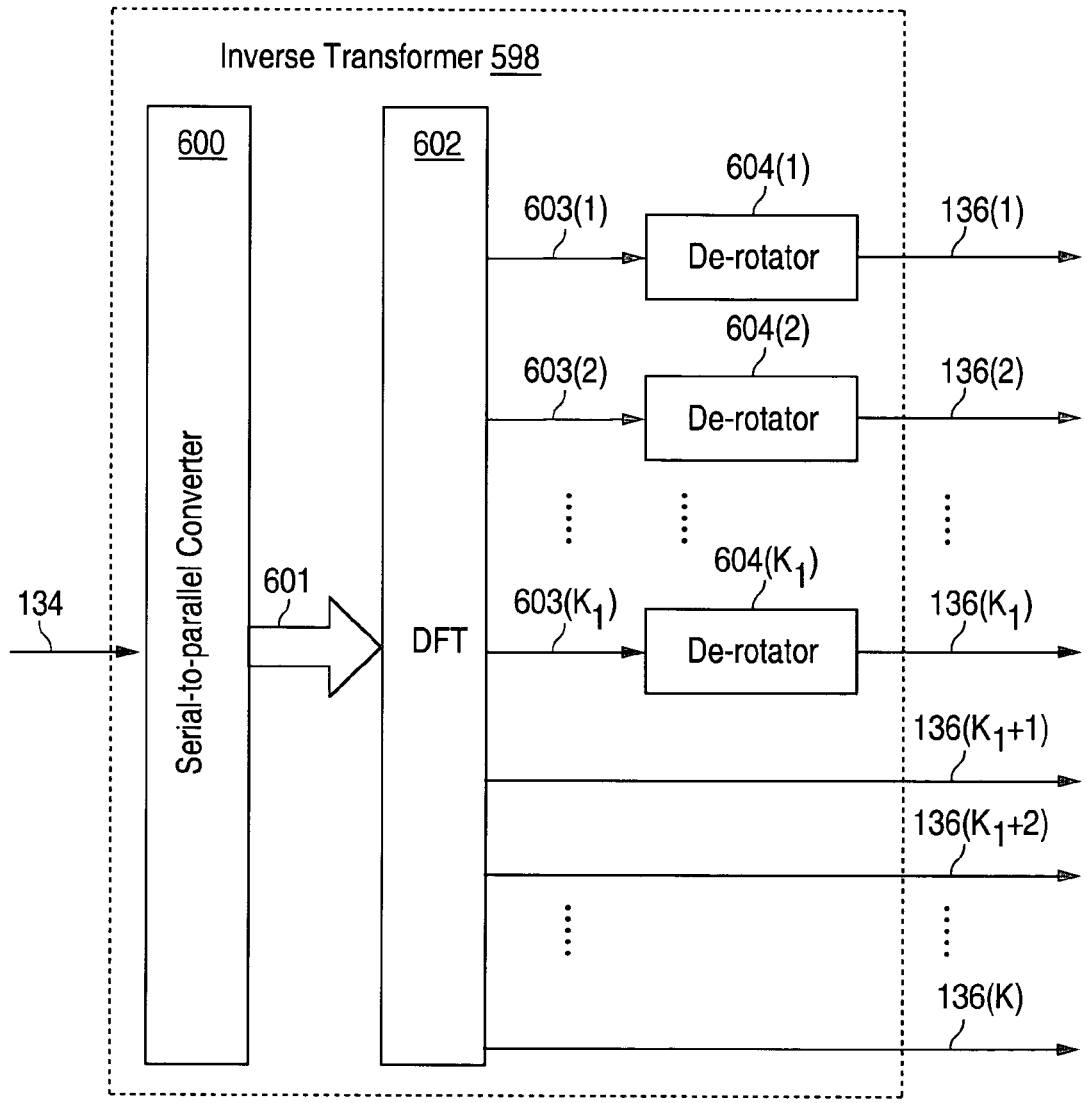
FIG. 6 is a block diagram illustrating the inverse transformer of FIG. 1 in accordance with a second embodiment of the present invention.

FIG. 5 is a block diagram illustrating a transformer 498 in accordance with one embodiment of the present invention. FIG. 6 is a block diagram illustrating an inverse transformer 598 in accordance with one embodiment of the present invention. As described above, the inverse transformer 598 may be used as the inverse transformer 108 in the transmission system 100, which comprises an OFDM transmission system, while the transformer 498 is used as the transformer 104.

For this embodiment, the combiner 306 and subcarrier modulators of FIG. 3 may be replaced with an Inverse Discrete Frequency Transform (IDFT) 504 and a parallel-to-serial converter 505. In addition, the subcarrier demultiplexer 400 may be realized with a serial-to-parallel converter 600 and a Discrete Frequency Transform (DFT) 602.

Related to the embodiments illustrated in FIGS. 1, 3, 4, 5 and 6, the demodulators may be implemented by a single unit to employ a complex algorithm to detect the transmitted symbols encoded prior to the modulator with some redundancy. For example, the transmitted symbols encoded through a convolutional coder and interleaved can be detected effectively by Viterbi algorithm. In that case, the outputs of the inverse transformer are ordered in a sequential form and de-interleaved prior to detection. Then, a Viterbi algorithm can be employed. For this embodiment, de-rotation may be combined to be a part of the digital demodulation and the rotations can be resolved through the detection algorithm.

Following is a description of one embodiment of a method for determining which PAR subcarriers are to be rotated. For this embodiment, the transmission system 100 comprises an OFDM transmission system. However, it will be understood that the following mathematical formulation is one representation among many, each of which may be used to implement another embodiment of the method.

Consider an N-point Fast Fourier Transform (FFT). Let $S \subseteq \{0, 1, \ldots, N-1\}$ be a set of subcarrier frequency indices and $S^1 \subseteq S$ be PAR subcarrier frequency indices. Moreover, let $C_k$ be the constellation assigned to a subcarrier $k \in S$. If $k \in S_1$, then $C_k$ is reduced to its half as explained above so that the multiplication of a reduced constellation point by −1 can be distinguished in the inverse transformer 108.

An OFDM symbol in frequency domain becomes an array of $X(k) \in C_k$ for $k \in S$. The time domain OFDM symbol becomes, $$x(n) = \sum_{k \in S} X(k)\exp\left(j\frac{2\pi}{N}kn\right),$$

for n=0, 1, . . . , N−1. Suppose that $K_1$ is the number of the elements in $S_1$. In addition, let $b_k$ for $k \in S$. be an array of $\{-1,+1\}$, which can be called "rotation parameters."

The time domain OFDM symbol with low PAR can be written as follows, $$x_1(n) = x_0(n) + \sum_{k \in S_1} b_k X(k)\exp\left(j\frac{2\pi}{N}kn\right),$$

where $$x_0(n) = \sum_{k \in S-S_1} X(k)\exp\left(j\frac{2\pi}{N}kn\right)$$

is the transfer of non-PAR subcarriers into the time domain and $b_k$'s are selected so that $x_1(n)$ for n=0, 1, . . . , N−1 has low peak amplitude.

FIGS. 7A-B are block diagrams illustrating a two-stage shift register 700 and a trellis diagram 720 that may be used in the transmission system 100 in order to implement a peak-to-average power ratio reduction technique in accordance with one embodiment of the present invention. According to this embodiment, the selection of PAR subcarriers are to be rotated is made using a trellis search algorithm. However, as described above in connection with FIG. 1, any other suitable method may be implemented without departing from the scope of the present invention.

Define $f:\{1, 2, \ldots, K_1\}) \to S_1$ satisfying that, $$|X(f(r))| > |X(f(r+1))|,$$

for $r=1, 2, \ldots, K_1$. The state transition of a trellis diagram with depth m can be determined by means of an m-stage shift register, such as the two-stage shift register 700 of FIG. 7A, that is fed from one end with the inputs of either +1 or −1. The shift register 700 has $N_s=2^m$ states. For each state, define two transition metrics:

$$J_s(r,n) = J_{s_1}(r-1) + a \cdot d(r,n) \text{ and}$$

$$J'_s(r,n) = J_{s_2}(r-1) + a \cdot d(r,n),$$

where s is the current state, $s_1$ and $s_2$ are the two possible previous states, a is either +1 or −1 depending on the transition, and d(r,n) is $$d(r, n) = X(f(r))\exp\left(j\frac{2\pi}{N}f(r)n\right),$$

for $n=0, 1, \ldots, N-1$ and $r=1, 2; \ldots, K_1$. The function $f$ re-orders the PAR subcarriers so that the rotation parameters of the subcarriers with higher absolute amplitudes are determined first. Formally, the transition from $s_1$ to s is chosen if $$\max_n |J_s(r, n)| \le \max_n |J'_s(r, n)|.$$

Otherwise, the transition from $s_2$ to s is chosen. The initial metrics of the states are set to $J_s(0,n) = x_0(n)$. At the end of this search algorithm, there are $2^m$ different OFDM symbols, $J_s(K_1,n)$, for all states s. The OFDM symbol, $J_s(K_1,n)$, that satisfies for all states s, $$\max_n |J_{s'}(K_1, n)| \le \max_n |J_s(K_1, n)|$$

is selected.

This embodiment implementing a trellis search algorithm using the trellis diagram 720 may provide PAR with a probability of 0.999 at an output close to 5 dB, with a redundancy of 1/12 for a multi-carrier transmission system 100 comprising 48 subcarriers with 64-QAM constellations. The original PAR with a probability of 0.999 without any processing is 8.4 dB. Hence, this corresponds to 3.4 dB decrease in PAR.

Figure 8:
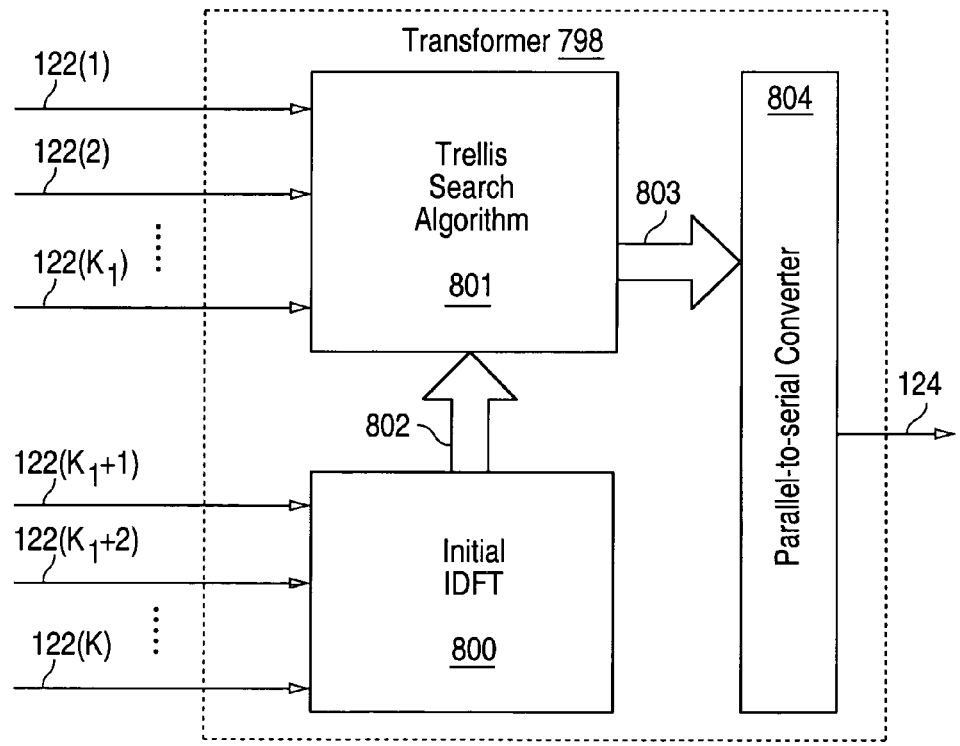
FIG. 8 is a block diagram illustrating the transformer of FIG. 1 in accordance with a third embodiment of the present invention.

FIG. 8 is a block diagram illustrating a transformer 798 in accordance with one embodiment of the present invention. The transformer 798 may be used as one embodiment of the transformer 104 for an OFDM transmission system 100 with the trellis search algorithm. The initial metric $x_0(n)$ for n=0, 1, . . . , N−1, 802 is calculated by means of the modulator outputs corresponding to the non-PAR subcarriers, 122(K1+1), 122(K1+2), . . . and 122(K) through an initial IDFT block 800. Then, the trellis search algorithm 801 re-orders the modulator outputs 122(1), 122(2), . . . and 122(K1) in descending order according to their amplitudes, as defined by the function definition $f$ above. The trellis search algorithm's output 803 is an OFDM symbol (multi-carrier transmission symbol) with length N. This output 803 enters a parallel-to-serial converter 804.

Figure 9:
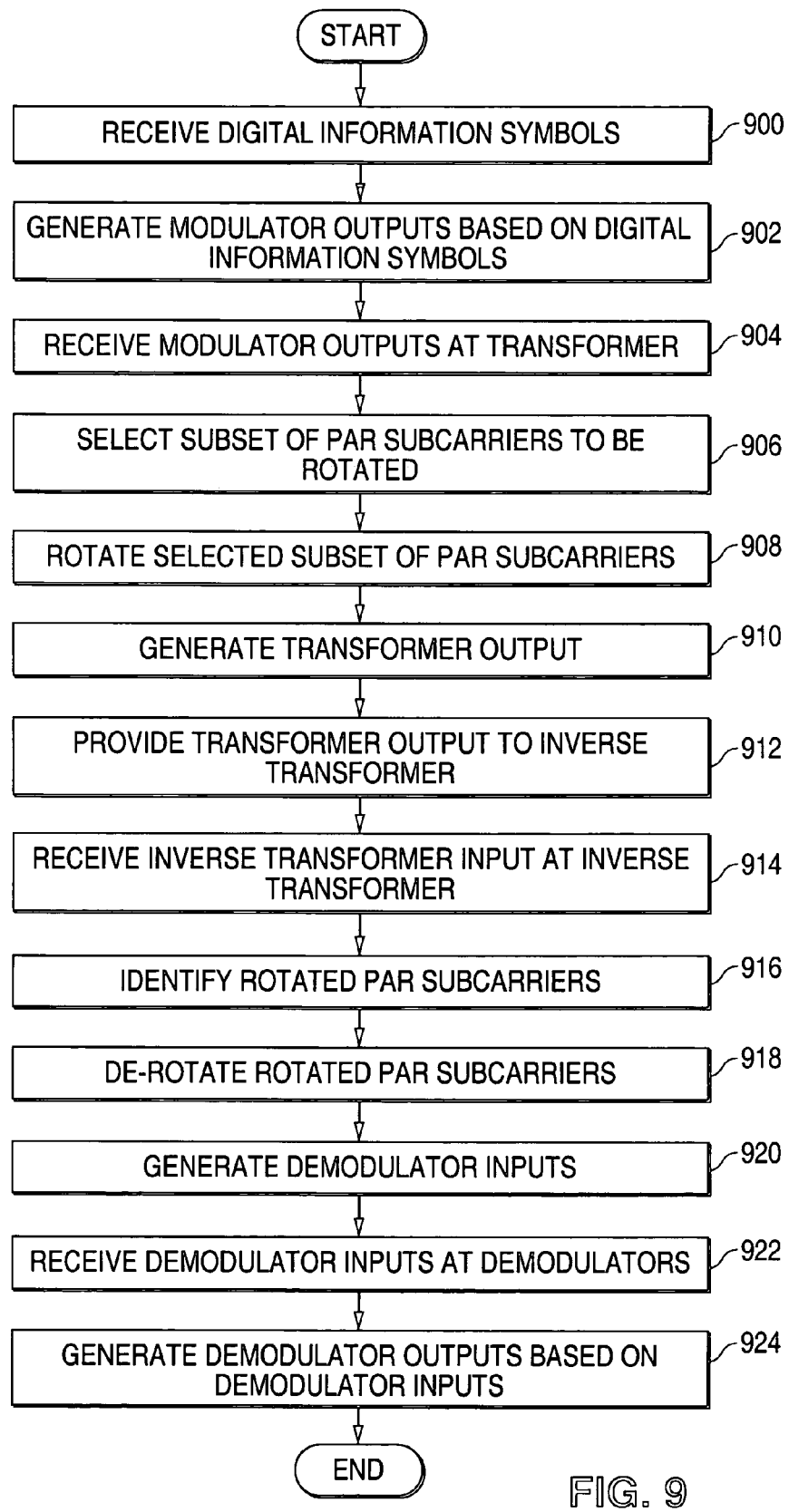
FIG. 9 is a flow diagram illustrating a method for reducing peak-to-average power ratios in the transmission system of FIG. 1 in accordance with one embodiment of the present invention.

FIG. 9 is a flow diagram illustrating a method for reducing peak-to-average power ratios in the transmission system 100 in accordance with one embodiment of the present invention. The method begins at step 900 where a digital information symbol 120 is received at each of a plurality of modulators 102. At step 902, each modulator 102 maps the received digital information symbol into a complex plane to generate a modulator output 122, the modulator outputs 122 comprising PAR subcarriers and non-PAR subcarriers.

At step 904, the modulator outputs 122 are received in parallel at the transformer 104. At step 906, the transformer 104 selects from the modulator outputs 122 a subset of the PAR subcarriers to be rotated by 180°. According to one embodiment, the transformer 104 selects the subset of PAR subcarriers to be rotated using a trellis search algorithm. However, it will be understood that the transformer 104 may select the subset of PAR subcarriers to be rotated using any suitable method without departing from the scope of the present invention.

At step 908, the transformer 104 rotates the selected subset of PAR subcarriers by 180°. At step 910, the transformer 104 generates a transformer output 124 based on the modulator outputs 122 using the rotated PAR subcarriers, the unrotated PAR subcarriers and the unrotated non-PAR subcarriers.

At step 912, the physical link 106 receives the transformer output 124 from the transformer 104 and provides the transformer output 124 to the inverse transformer 108 as an inverse transformer input 134. At step 914, the inverse transformer 108 receives the inverse transformer input 134 from the physical link 106.

At step 916, the inverse transformer 108 identifies the rotated PAR subcarriers in the inverse transformer input 134. According to one embodiment, the inverse transformer 108 identifies the rotated PAR subcarriers based on the reduced constellations of the subcarriers and the inverse transformer input 134. However, it will be understood that the inverse transformer 108 may identify the rotated PAR subcarriers using any suitable method without departing from the scope of the present invention. At step 918, the inverse transformer 108 de-rotates the rotated PAR subcarriers.

At step 920, the inverse transformer 108 generates, for each of a plurality of demodulators 110, a demodulator input 136 based on the inverse transformer input 134 using the de-rotated PAR subcarriers, the unrotated PAR subcarriers and the unrotated non-PAR subcarriers. At step 922, each demodulator 110 receives the corresponding demodulator input 136 from the inverse transformer 108.

At step 924, each demodulator 110 generates a demodulator output 144 based on the demodulator input 136 received from the inverse transformer 108, at which point the method comes to an end. According to one embodiment, each demodulator 110 generates a demodulator output 144 by performing either hard detection or information-bearing metrics for soft detection. However, it will be understood that each demodulator 110 may generate a demodulator output 144 in any suitable manner without departing from the scope of the present invention.

In addition, it will be understood that, in accordance with one embodiment, the inverse transformer 108 may identify the rotated PAR subcarriers while the demodulator inputs 136 are generated and the demodulator output 144 is generated without departing from the scope of the present invention.

Although the present invention has been described with several embodiments, various changes and modifications may be suggested to one skilled in the art. It is intended that the present invention encompass such changes and modifications as fall within the scope of the appended claims.

What is claimed is:

1. A method comprising:
   receiving a plurality of modulator outputs from a plurality of modulators, the modulator outputs comprising PAR subcarriers and non-PAR subcarriers;
   selecting a subset of the PAR subcarriers;
   rotating and modulating the selected subset of PAR subcarriers using a plurality of multipliers; and
   generating a transformer output by summing the rotated and modulated PAR subcarriers using a combiner.

2. The method of claim 1, further comprising:
   receiving a plurality of digital information symbols at the modulators; and
   mapping the digital information symbols into a complex plane to generate the modulator outputs.

3. The method of claim 1, wherein rotating the selected subset of PAR subcarriers comprises rotating the selected subset of PAR subcarriers by 180°.

4. An apparatus comprising:
   a plurality of modulators operable to generate a plurality of modulator outputs, the modulator outputs comprising PAR subcarriers and non-PAR subcarriers; and
   a transformer operable to:
      receive the modulator outputs;
      select a subset of the PAR subcarriers;
      rotate the selected subset of PAR subcarriers; and
      generate a transformer output using the rotated PAR subcarriers;
   wherein the transformer comprises:
      a plurality of multipliers operable to selectively rotate the PAR subcarriers and to modulate the subcarriers;
      a controller operable to select the subset of PAR subcarriers to be rotated; and
      a combiner operable to generate the transformer output by summing the modulated subcarriers.

5. The apparatus of claim 4, wherein:
   two multipliers are used to selectively rotate and modulate each PAR subcarrier; and
   a single multiplier is used to modulate each non-PAR subcarrier.

6. An apparatus comprising:
   a plurality of modulators operable to generate a plurality of modulator outputs, the modulator outputs comprising PAR subcarriers and non-PAR subcarriers; and
   a transformer operable to:
      receive the modulator outputs;
      select a subset of the PAR subcarriers;
      rotate the selected subset of PAR subcarriers; and
      generate a transformer output using the rotated PAR subcarriers;
   wherein the transformer comprises:
      a plurality of multipliers operable to selectively rotate the PAR subcarriers;
      a controller operable to select the subset of PAR subcarriers to be rotated;
      an inverse discrete frequency transform operable to receive the rotated PAR subcarriers, unrotated PAR subcarriers, and unrotated non-PAR subcarriers; and
      a parallel-to-serial converter operable to receive an output of the inverse discrete frequency transform.

7. The apparatus of claim 4, wherein each of the modulators is further operable to:
   receive a digital information symbol; and
   map the digital information symbol into a complex plane to generate one of the modulator outputs.

8. The apparatus of claim 4, wherein the transformer is operable to rotate the selected subset of PAR subcarriers by 180°.

9. A method comprising:
   receiving an inverse transformer input at an inverse transformer;
   identifying rotated PAR subcarriers in the inverse transformer input, the inverse transformer input also comprising unrotated PAR subcarriers and unrotated non-PAR subcarriers; and
   de-rotating the rotated PAR subcarriers using the inverse transformer.

10. The method of claim 9, wherein the rotated PAR subcarriers comprise a subset of PAR subcarriers selected using a trellis search algorithm.

11. The method of claim 9, further comprising:
   generating a plurality of demodulator inputs based on the inverse transformer input and the de-rotated PAR subcarriers; and
   generating a plurality of demodulator outputs based on the demodulator inputs.

12. The method of claim 11, wherein generating the plurality of demodulator outputs comprises performing one of: hard detection and information-bearing metrics for soft detection.

13. An apparatus comprising:
   an inverse transformer operable to:
      receive an inverse transformer input;
      identify rotated PAR subcarriers in the inverse transformer input, the inverse transformer input also comprising unrotated PAR subcarriers and unrotated non-PAR subcarriers; and
      de-rotate the rotated PAR subcarriers to produce a plurality of inverse transformer outputs; and
   a plurality of demodulators operable to generate a plurality of demodulator outputs based on the inverse transformer outputs and the de-rotated PAR subcarriers.

14. The apparatus of claim 13, wherein the rotated PAR subcarriers comprise a subset of PAR subcarriers selected using a trellis search algorithm.

15. The apparatus of claim 13, wherein the inverse transformer comprises:
   a plurality of de-rotators operable to de-rotate the rotated PAR subcarriers; and
   a demultiplexer operable to provide the PAR subcarriers to the de-rotators and to output the unrotated non-PAR subcarriers.

16. The apparatus of claim 15, wherein each de-rotator is operable to determine if one of the PAR subcarriers has been rotated according to a reduced constellation assigned to that subcarrier.

17. The apparatus of claim 15, wherein:
   the demultiplexer is further operable to generate a metric for each subcarrier; and
   each de-rotator is operable to use the metric associated with one of the PAR subcarriers to determine if that PAR subcarrier has been rotated.

18. The apparatus of claim 13, wherein the inverse transformer comprises:
- a plurality of de-rotators operable to de-rotate the rotated PAR subcarriers;
- a serial-to-parallel converter; and
- a Discrete Frequency Transform operable to receive an output of the serial-to-parallel converter, provide the PAR subcarriers to the de-rotators, and output the unrotated non-PAR subcarriers.

19. The method of claim 1, wherein selecting the subset of PAR subcarriers comprises selecting the subset of PAR subcarriers using a trellis search algorithm.

20. The method of claim 9, wherein de-rotating the rotated PAR subcarriers produces a plurality of inverse transformer outputs; and
- further comprising outputting the inverse transformer outputs to a plurality of demodulators and generating a plurality of demodulator outputs based on the inverse transformer outputs and the de-rotated PAR subcarriers.

21. An apparatus comprising:
- a plurality of modulators operable to generate a plurality of modulator outputs, the modulator outputs comprising PAR subcarriers and non-PAR subcarriers; and
- a transformer operable to:
  - receive the modulator outputs;
  - select a subset of the PAR subcarriers;
  - rotate the selected subset of PAR subcarriers; and
  - generate a transformer output using the rotated PAR subcarriers;
- wherein the transformer comprises:
  - an inverse discrete frequency transform operable to receive the non-PAR subcarriers and to generate metrics;
  - a trellis search unit operable to receive the PAR subcarriers and the metrics, re-order the PAR subcarriers so that rotation parameters of the PAR subcarriers with higher absolute amplitudes are determined first, and generate a multi-carrier transmission symbol; and
  - a parallel-to-serial converter operable to receive the multi-carrier transmission symbol.

\* \* \* \* \*

UNITED STATES PATENT AND TRADEMARK OFFICE
CERTIFICATE OF CORRECTION

| | | |
|---|---|---|
| PATENT NO. | : 7,675,986 B1 | Page 1 of 1 |
| APPLICATION NO. | : 11/602482 | |
| DATED | : March 9, 2010 | |
| INVENTOR(S) | : Aydin Nergis | |

It is certified that error appears in the above-identified patent and that said Letters Patent is hereby corrected as shown below:

Column 1, line 37, delete "2.000" and replace with --2000--.

Signed and Sealed this
First Day of March, 2011

David J. Kappos
*Director of the United States Patent and Trademark Office*